(12) United States Patent
Stork Genannt Wersborg

(10) Patent No.: US 9,056,368 B2
(45) Date of Patent: Jun. 16, 2015

(54) METHOD AND DEVICE FOR MONITORING A LASER PROCESSING OPERATION TO BE PERFORMED ON A WORKPIECE AND LASER PROCESSING HEAD HAVING SUCH A DEVICE

(75) Inventor: Ingo Stork Genannt Wersborg, München (DE)

(73) Assignees: PRECITEC KG, Gaggenau-Bad Rotenfels (DE); PRECITEC ITM GMBH, Eschborn (DE)

( * ) Notice: Subject to any disclaimer, the term of this patent is extended or adjusted under 35 U.S.C. 154(b) by 975 days.

(21) Appl. No.: 13/130,499

(22) PCT Filed: Nov. 20, 2009

(86) PCT No.: PCT/EP2009/008294
§ 371 (c)(1),
(2), (4) Date: Aug. 8, 2011

(87) PCT Pub. No.: WO2010/057662
PCT Pub. Date: May 27, 2010

(65) Prior Publication Data
US 2011/0284512 A1    Nov. 24, 2011

(30) Foreign Application Priority Data

| Nov. 21, 2008 | (DE) | 10 2008 058 422 |
| Jul. 20, 2009 | (DE) | 10 2009 033 881 |
| Aug. 7, 2009 | (EP) | 09010230 |
| Sep. 4, 2009 | (EP) | 09011375 |

(51) Int. Cl.
*B23K 26/00* (2014.01)
*B23K 26/14* (2014.01)
(Continued)

(52) U.S. Cl.
CPC .......... *B23K 26/03* (2013.01); *B23K 26/02* (2013.01); *B23K 26/04* (2013.01)

(58) Field of Classification Search
USPC .......................... 219/121.6–121.86
See application file for complete search history.

(56) References Cited

U.S. PATENT DOCUMENTS

| 5,517,420 A | 5/1996 | Kinsman et al. |
| 6,311,099 B1 | 10/2001 | Jasper et al. |

(Continued)

FOREIGN PATENT DOCUMENTS

| CA | 2390873 A1 | 6/2001 |
| CN | 1384772 A | 12/2002 |

(Continued)

OTHER PUBLICATIONS

Farson et al., "Intelligent Laser Welding Control," Proceedings of International Congress on the Applications of Lasers and Electro-Optics, vol. 1722, Jan. 1, 1991, pp. 104-112.

(Continued)

*Primary Examiner* — Sang Y Paik
(74) *Attorney, Agent, or Firm* — Muncy, Geissler, Olds & Lowe, P.C.

(57) ABSTRACT

The invention relates to a method for monitoring a laser machining operation to be performed on a workpiece, comprising the following steps: detecting at least two current measured values by at least one sensor, which monitors the laser machining operation, determining at least two current characteristic values from the at least two current measured values, wherein the at least two current characteristic values jointly represent a current fingerprint in a characteristic value space, providing a predetermined point set in the characteristic value space, and classifying the laser machining operation by detecting the position of the current fingerprint relative to the predetermined point set in the characteristic value space, wherein the at least one sensor comprises at least one camera unit, which records camera images with different exposure times and processes them together by using a high dynamic range (HDR) method, in order to provide images having a high contrast ratio as the current measured values.

16 Claims, 16 Drawing Sheets

Figure 1:
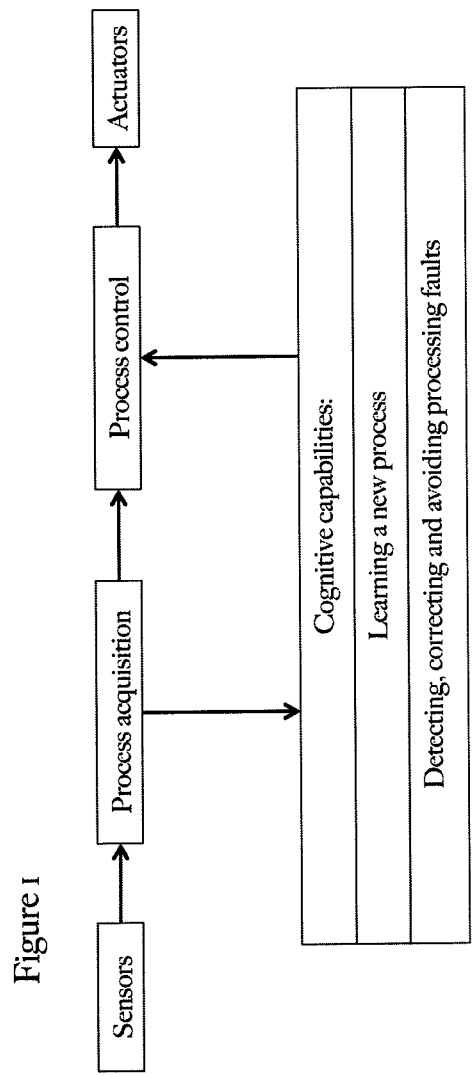

(51) Int. Cl.
*B23K 26/03* (2006.01)
*B23K 26/02* (2014.01)
*B23K 26/04* (2014.01)

(56) References Cited

U.S. PATENT DOCUMENTS

| | | | |
|---|---|---|---|
| 6,670,574 B1 * | 12/2003 | Bates et al. | 219/121.64 |
| 7,129,438 B2 | 10/2006 | Bates et al. | |
| 7,173,245 B2 * | 2/2007 | Shakouri et al. | 250/339.11 |
| 7,364,306 B2 * | 4/2008 | Margulis | 353/31 |
| 7,577,285 B2 * | 8/2009 | Schwarz et al. | 382/141 |
| 2008/0166022 A1 | 7/2008 | Hildreth | |

FOREIGN PATENT DOCUMENTS

| | | |
|---|---|---|
| CN | 1476951 A | 2/2004 |
| DE | 19957163 C1 | 8/2001 |
| DE | 101 03 255 A1 | 8/2002 |
| DE | 102008038332 A1 | 1/2009 |
| EP | 1145795 A2 | 10/2001 |
| EP | 1366847 A1 | 12/2003 |
| EP | 1 415 755 A2 | 5/2004 |
| JP | H08309578 A | 11/1996 |
| JP | 2002239767 A | 8/2002 |
| JP | 2002346783 A | 12/2002 |
| RU | 2138374 C1 | 9/1999 |
| RU | 2155653 C2 | 9/2000 |
| RU | 2312745 C2 | 12/2007 |
| WO | WO99/14640 | 3/1999 |
| WO | WO-01/39919 A2 | 6/2001 |

OTHER PUBLICATIONS

Jonas Unger et al., "High Dynamic Range Video for Photometric Measurement of Illumination", ist/spie 19$^{th}$ International Symposium on Electronic Imaging: Sensors, Cameras and Systems for Scientific/Industrial Applications, 2007, 10 pages, http://liu,diva-documents/smash/get/diva2:260918/FULL_TEXT01.

* cited by examiner

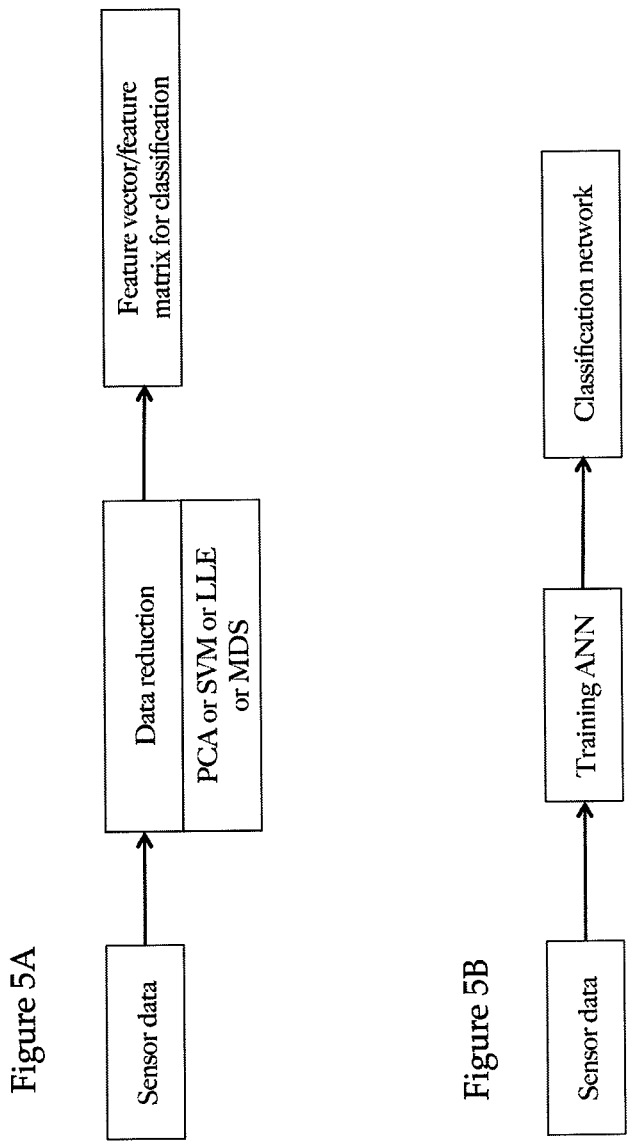

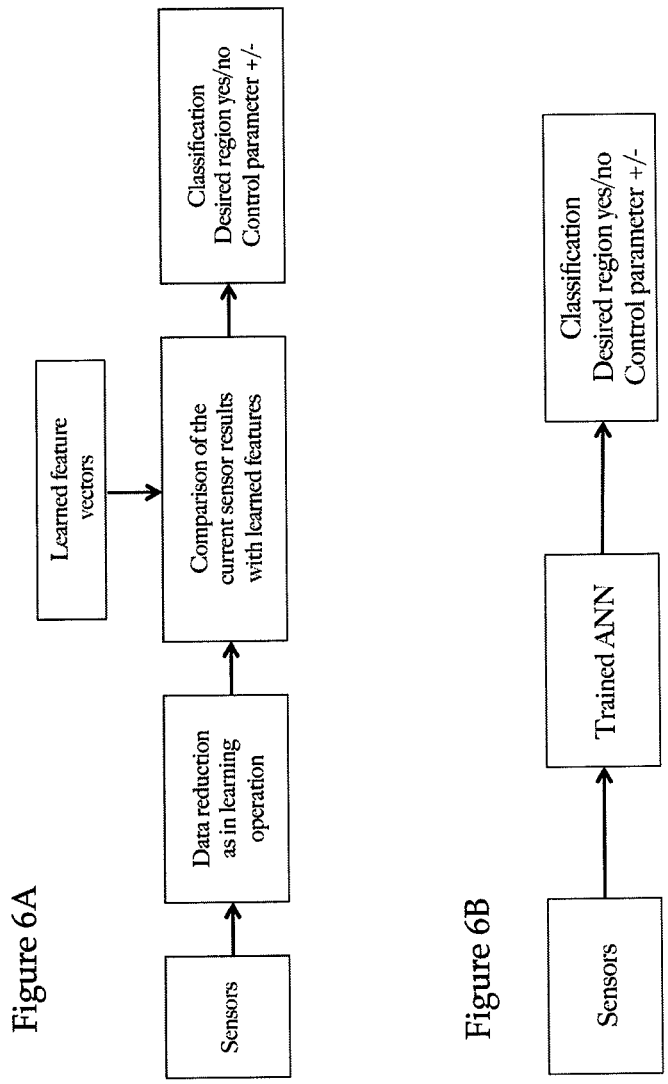

1 Process emission
2 Vapor capillary (keyhole)
3 Melt pool
4 Welding seam geometry
5 Processing surface

METHOD AND DEVICE FOR MONITORING A LASER PROCESSING OPERATION TO BE PERFORMED ON A WORKPIECE AND LASER PROCESSING HEAD HAVING SUCH A DEVICE

The invention relates to a method and a device for monitoring a laser processing operation to be performed on a workpiece, and to a laser processing head having such a device.

In laser material processing, workpieces are cut or joined by means of focused laser radiation, process monitoring systems and sensors being used both for a laser cutting operation and for a laser welding operation. By way of example, sensors for detecting the radiation coming from a work or interaction zone determined by the working focus are used for monitoring the welding or cutting process. Provided in this context as standard are radiation sensors for observing a plasma forming over the interaction zone, and a back reflection sensor that detects the back-reflection radiation of the laser from the interaction zone between the laser beam and a workpiece to be processed. Furthermore, in order to monitor the laser processing operation use is made of temperature sensors or infrared sensors that can be used to monitor edge melting and the temperature profile during processing. In addition to the use of photodiodes that are sensitive in each case to a specific wavelength range, the laser processing operation is, furthermore, monitored via cameras that can likewise be sensitive in predetermined wavelength ranges. Characteristics for monitoring the laser processing operation, such as, for example, parameters regarding the melted workpiece area can likewise be obtained on the basis of image processing of the images recorded by the cameras.

A first goal of the monitoring systems is initially to classify the processing quality in accordance with the process specification. A second goal is to improve the processing quality by controlling and closed-loop controlling the processes. In present day industrial systems, the sensors and cameras used for process monitoring are applied to perform a classification of the current state of the processing operation with the aid of the detected sensor data and of methods for image processing and data analysis. Methods used in this case are individually set to the processing operations. Given an intensity deviation in the recorded sensor data, the current processing operation is classified as insufficient, appropriate closed-loop control mechanisms being used in order to eliminate this state. Here, the control of the process parameters regarding the recorded sensor data relates, however, only to the respective measured data of the corresponding sensors.

It is the object of the invention to create a method and a device for monitoring a laser processing operation to be carried out on a workpiece by means of which the classification of a laser processing state, and thereby the processing quality of a laser processing operation to be performed on a workpiece, are improved.

This object is achieved by the method as claimed in claim 1, the control device as claimed in claim 14, and by the laser processing head as claimed in claim 18. Advantageous refinements and developments of the invention are set forth in the subclaims.

According to the invention, a method for monitoring, controlling or closed-loop controlling a laser processing operation to be performed on a workpiece is provided that has the following steps: detecting at least two current measured values by means of at least one sensor that monitors the laser processing operation, determining at least two current features or characteristics from the at least two current measured values, the at least the two current features jointly representing a current fingerprint in a feature or characteristic space, providing a predetermined point set in the feature space, and classifying the laser processing operation by detecting the position of the current fingerprint relative to the predetermined point set in the feature space, the at least one sensor comprising at least one camera unit that records camera images with different exposure times and processes said camera images with each other using a high dynamic range (HDR) method in order to provide images with high contrast ratio as current measured values.

It is advantageous here when the HDR method is designed to process the camera images so that, in the case of performance of a laser processing operation, the surrounding processing surface of a workpiece to be machined and the process emission can be simultaneously visualized in one image.

In this case, the camera images are expediently recorded by multiple scanning of an imaging sensor of the camera unit, by simultaneous imaging with a plurality of cameras, or by sequential imaging with one camera with different exposure times.

The processing of the recorded camera images by the at least one camera unit is performed according to the invention by means of a weighting method with the aid of an entropy method or with the aid of a camera response function.

It is also advantageous when the camera images to be processed are recorded by means of a camera running ahead before the laser processing operation, a camera imaging the laser processing zone, and/or a camera running behind after the laser processing operation.

In order to process a workpiece to a quality of high value it is advantageous here when a "poor" fingerprint detected by means of the inventive method is directly counteracted during a processing operation, it being expedient when the inventive method additionally comprises a step of closed-loop controlling at least one process parameter of an associated actuator in such a way that, when the current fingerprint leaves the point set of the feature space, the at least one actuator is activated so that the change in the associated process parameter corresponds to a gradient in the feature space that, starting from the fingerprint, extends in the direction of the predetermined point set in the feature space.

It is advantageous here when the determination of a current feature from at least one current measured value comprises a method for data reduction or dimension reduction such as principal component analysis, multidimensional scaling, support vector machines or a support vector classification. The reduction in dimension or dimensionality of the sensor data enables classification to be performed much more quickly by a computer on the basis of the reduced data volume, which means, for example, that it is also possible to perform rapid control of a laser processing operation.

However, it is also conceivable and expedient for the determination of a current feature from at least one current measured value to be performed with the aid of an artificial neural network.

When use is made of a multiplicity of sensors whose measured data often permit indirect conclusions to be drawn regarding a processing situation, it is advantageous when the predetermined point set is defined inside the feature space by means of a learning process.

In this case, in order to closed-loop control the processing operation it is expedient when the gradient field of the feature space is determined in dependency of the process parameters in different regions at the points in the feature space that are representative of the respective region with regard to the gradient, the gradient of the feature space being determined in dependency of a process parameter by varying the process parameter at a predetermined point of the feature space.

To monitor comprehensively and determine a multiplicity of informative measured data, it is expedient when the at least one sensor is selected from a group that comprises at least one photodiode with filters for specific wavelengths, solid-borne and air-borne acoustic sensors, and at least one camera unit with an appropriate surface illumination.

To ensure a comprehensive closed-loop control of the laser processing operation, it is expedient when the at least one actuator is selected from a group that comprises a controller of the laser power, a processing velocity controller of the processing head relative to the workpiece, a controller of the focal point of the processing laser beam, a controller of the distance of the processing head from the workpiece, and a controller of the lateral offset.

According to the invention, there is further provided a device for performing the inventive method that comprises at least one sensor for monitoring the laser processing operation that is suitable for detecting at least two current measured values, a data processing unit for determining at least two features from the at least two current measured values in order to create a current fingerprint in a feature space, a memory unit for storing a predetermined point set inside the feature space, and a classification unit suitable for evaluating the laser processing operation by detecting the position of the current fingerprint relative to the predetermined point set in the feature space.

To use the inventive device in a closed-loop controlled processing operation it is advantageous in this case when the device further comprises a control unit for closed-loop controlling at least one process parameter of an associated actuator in such a way that, when the current fingerprint leaves the point set of the feature space, the at least one actuator is activated so that the change in the associated process parameter corresponds to a gradient in the feature space that, starting from the fingerprint, extends in the direction of the predetermined point set.

It is expedient in this case for the at least one sensor to be selected from a group that comprises at least one photodiode with filters for specific wavelengths, solid-borne and air-borne acoustic sensors, and at least one camera unit with an appropriate surface illumination.

Furthermore, it is advantageous to select the at least one actuator from a group that comprises a controller of the laser power, a processing velocity controller of the processing head relative to the workpiece, a controller of the focal point of the processing laser beam, a controller of the distance of the processing head from the workpiece, and a controller of the lateral offset.

Furthermore, according to the invention a laser processing head for processing a workpiece by means of a laser beam is provided that comprises the inventive device.

Figure 2:
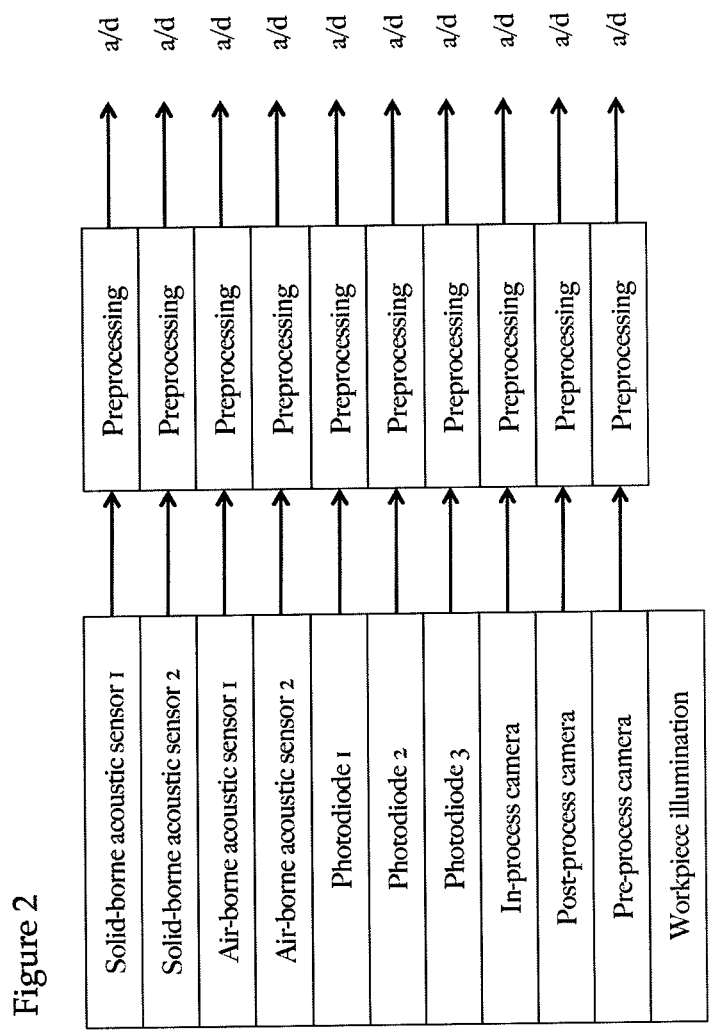
Figure 3:
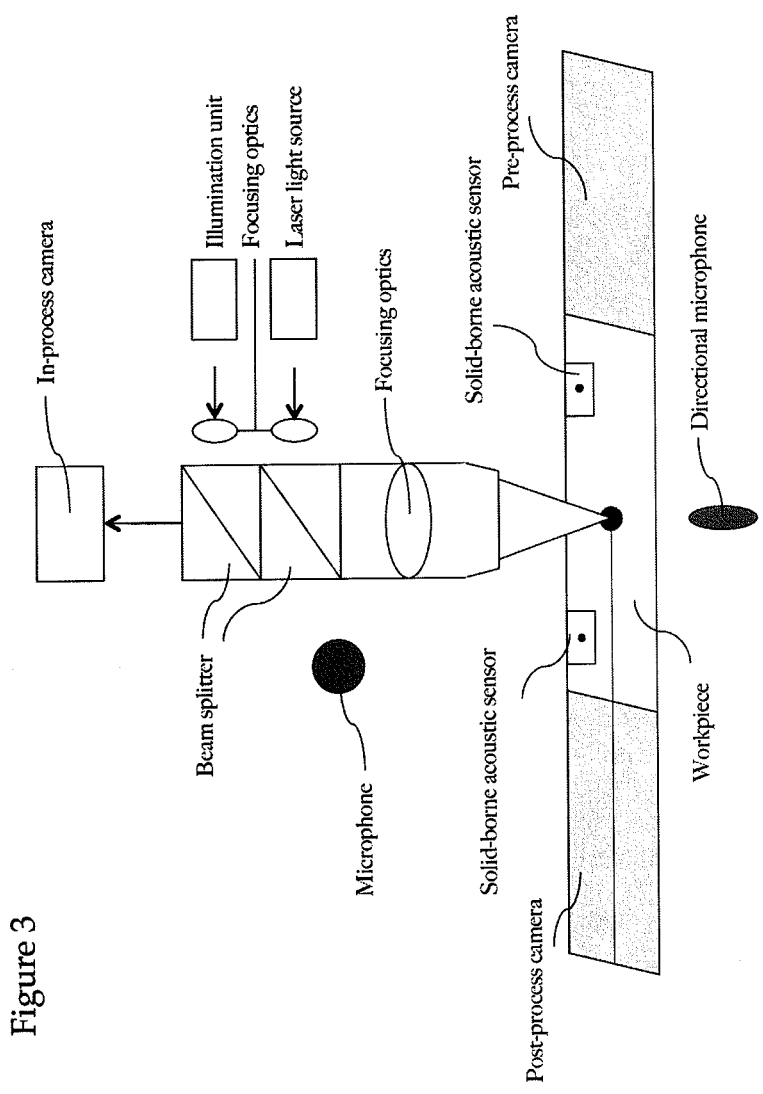
Figure 4A:
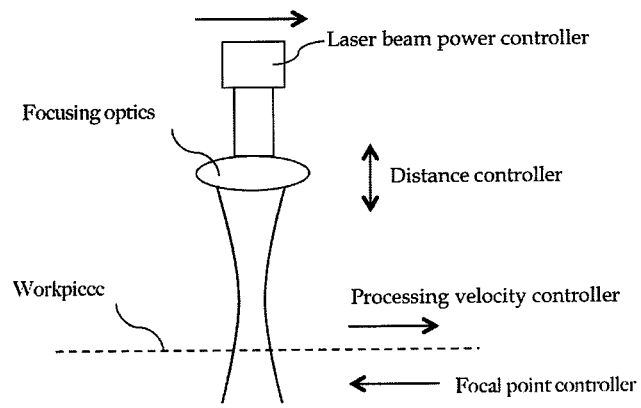
Figure 4B:
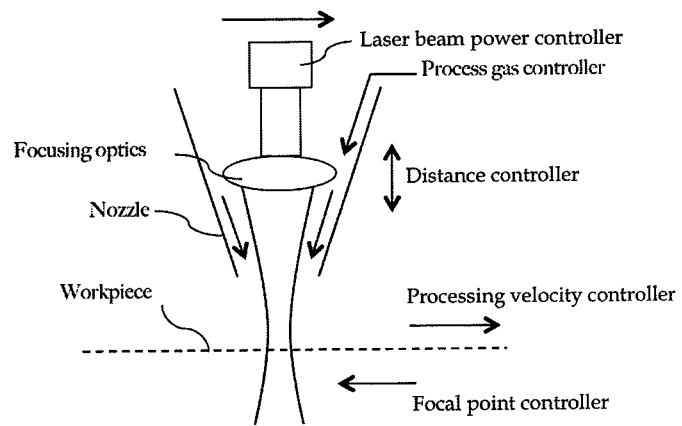
Figure 7:
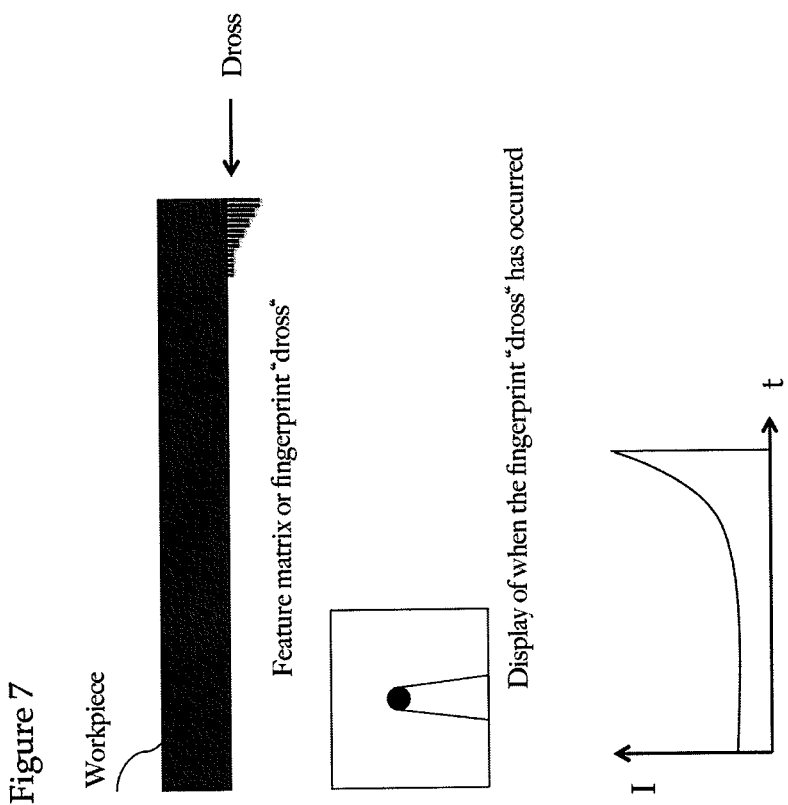
Figure 8:
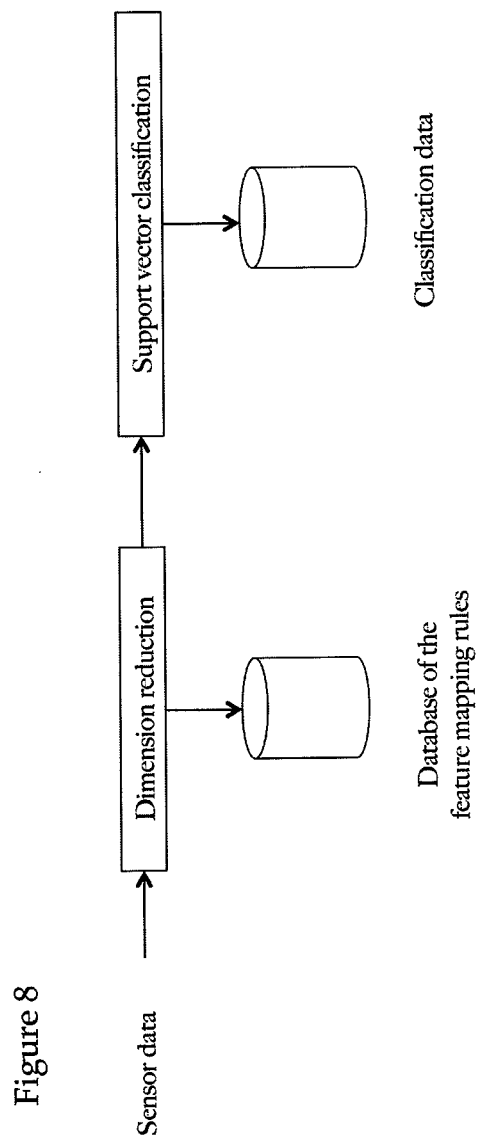
Figure 9:
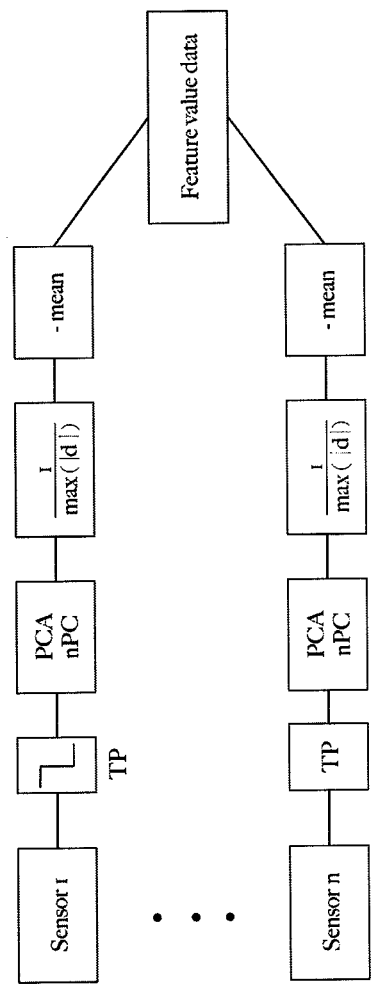
Figure 10:
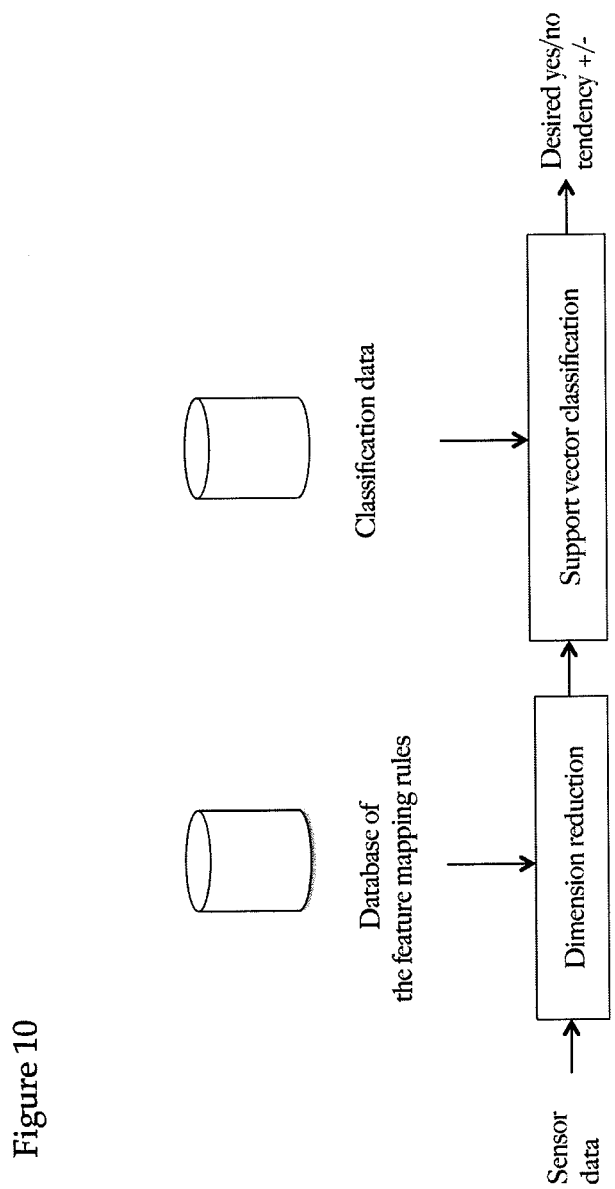
Figure 11:
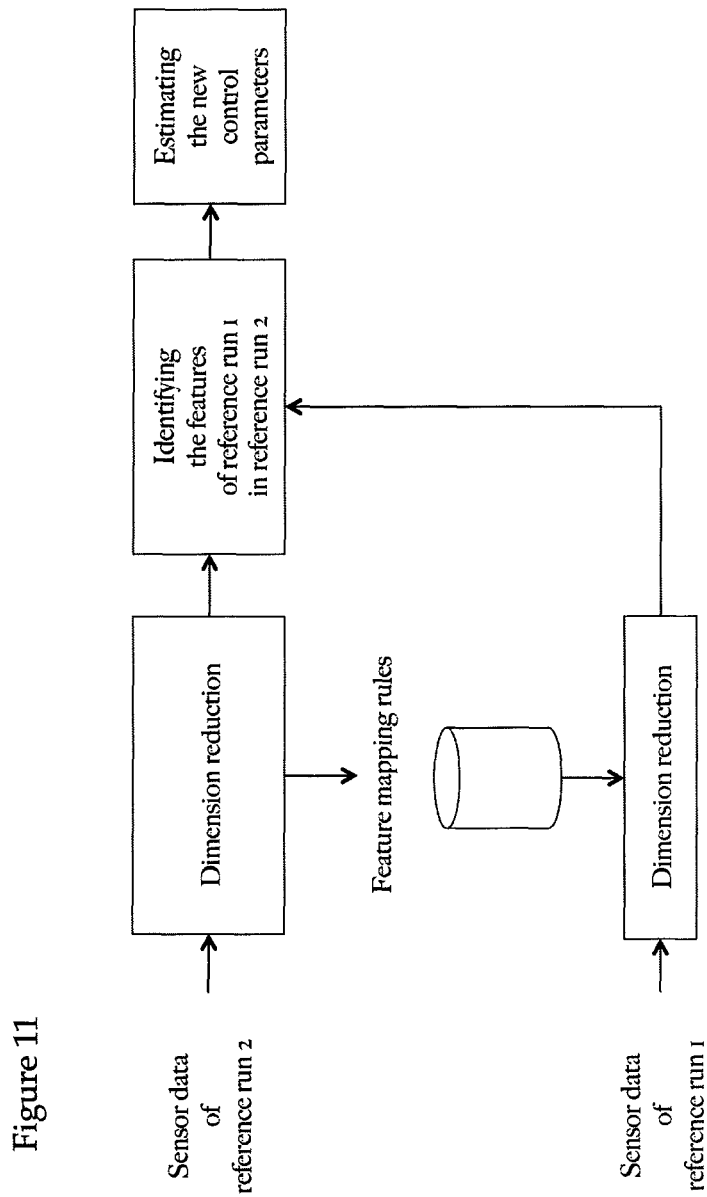
Figure 12:
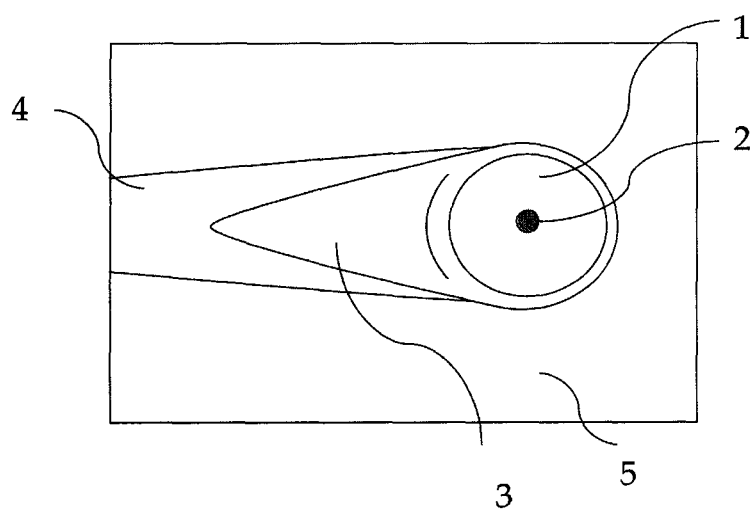
Figure 13:
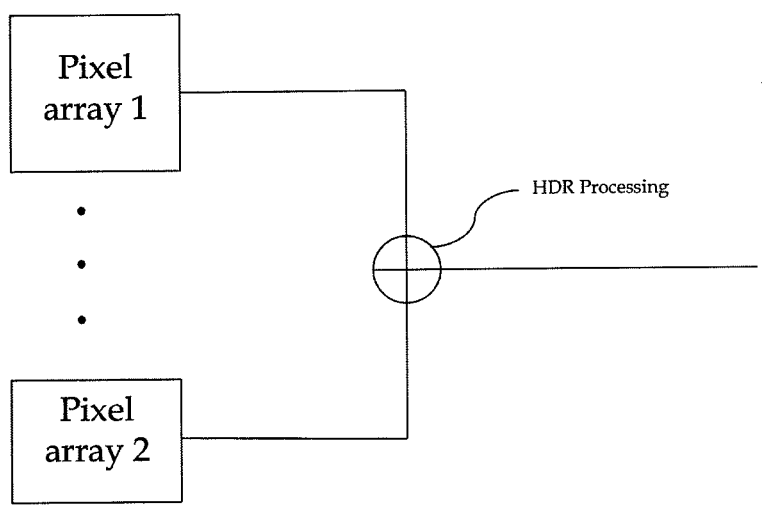
Figure 14:
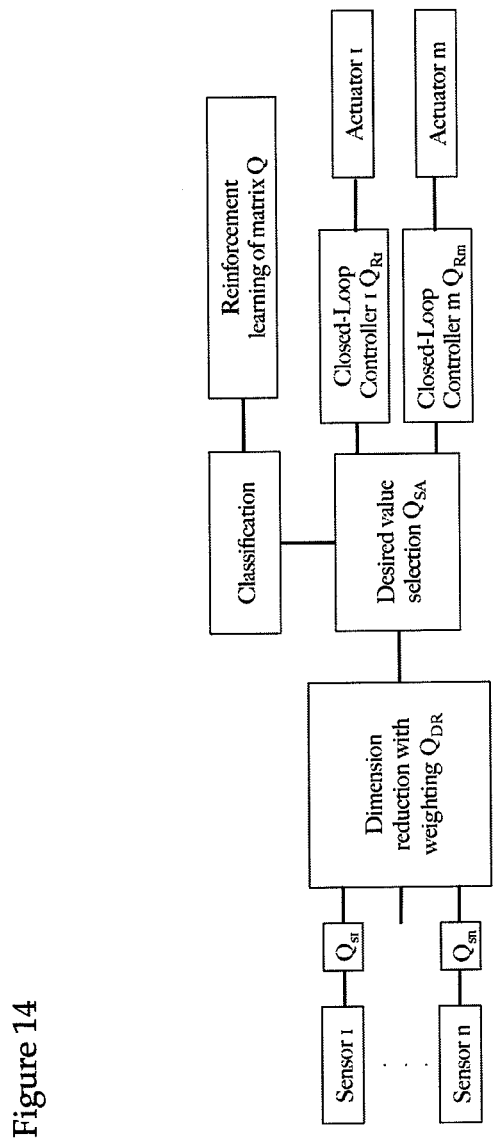
Figure 15:
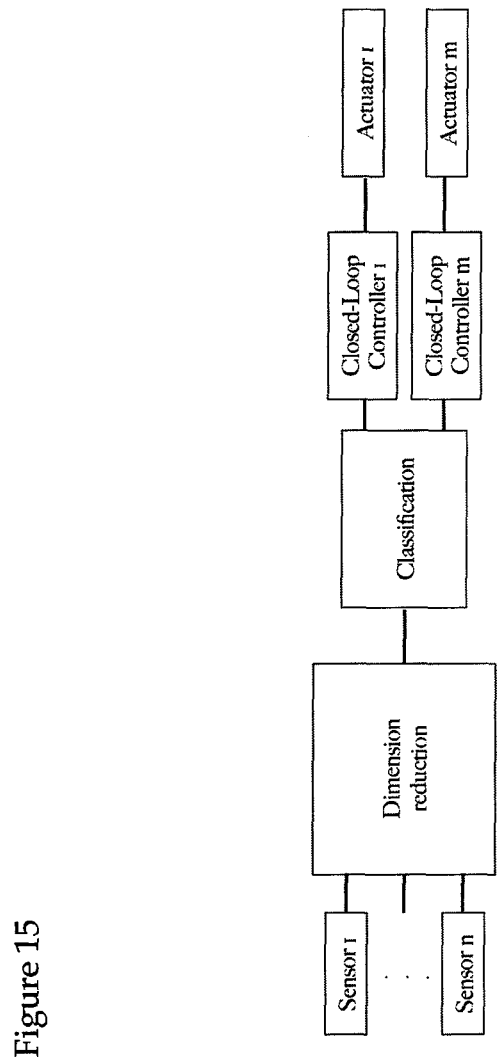
Figure 16:
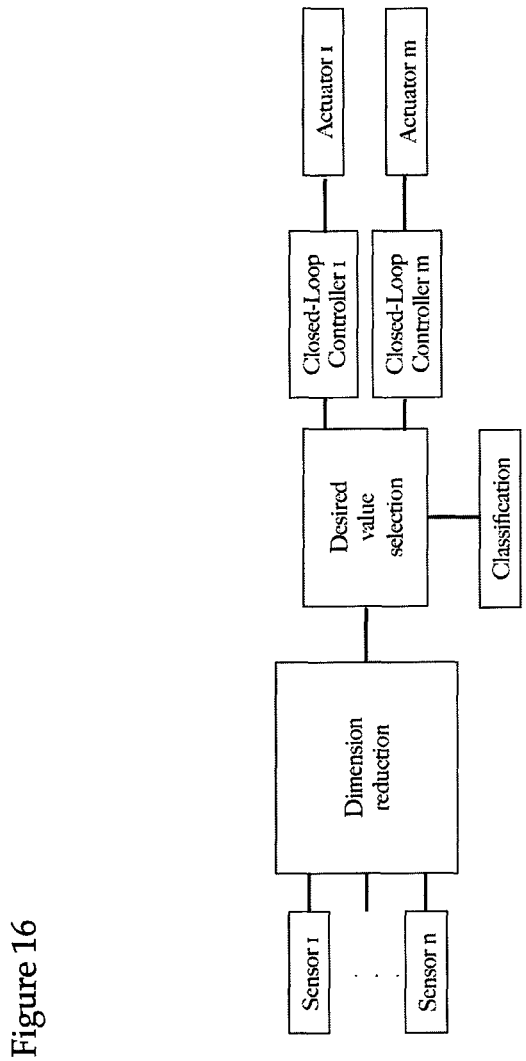

The invention is explained in more detail below by way of example with the aid of the drawing, in which:

FIG. 1 shows a flowchart with the essential components of the processing operation of a workpiece in accordance with the inventive method, FIG. 2 shows an overview of the sensors used in the inventive method in order to monitor and detect the laser processing operation, FIG. 3 is a greatly simplified schematic of the components used in an inventive processing operation, FIG. 4A is a greatly simplified schematic of a part of the actuator used in the inventive method during a laser beam welding process, FIG. 4B is a greatly simplified schematic of a part of the actuator used in the inventive method during a laser beam cutting process, FIG. 5A shows a flowchart of the creation of a fingerprint in accordance with the inventive method, use being made of linear and nonlinear dimension reducers, FIG. 5B shows a flowchart of the creation of a fingerprint in accordance with the inventive method, use being made of an artificial neural network, FIG. 6A shows a flowchart of the classification operation in accordance with inventive method, use being made of linear and nonlinear dimension reducers, and FIG. 6B shows a flowchart of the classification operation in accordance with the inventive method, use being made of an artificial neural network, FIG. 7 is a schematic illustrating a fault detection method, FIG. 8 shows a flowchart that illustrates the inventive learning of the fingerprints and the characteristics or features respectively, FIG. 9 shows a flowchart of the dimension reduction method in accordance with the invention, FIG. 10 shows a flowchart of the inventive assessment of the current processing operation, FIG. 11 shows a flowchart of the estimation of new control parameters in accordance with the invention, FIG. 12 is a schematic of a camera image that is processed by an HDR method in accordance with the invention, FIG. 13 shows a block diagram of an inventive HDR image sequence processing, FIG. 14 shows a flowchart of a classification procedure with the use of a reinforcement learning method during a laser processing operation in accordance with the invention, FIG. 15 shows a flowchart of a classification procedure with the use of a discriminant analysis method during a laser processing operation in accordance with the invention, and FIG. 16 shows a flowchart of a closed-loop controlling operation by means of desired values, obtained by dimension reduction, during a laser processing operation in accordance with the invention.

Mutually corresponding components are provided in the various figures of the drawing with the same reference symbols.

In accordance with the invention, a cognitive laser material processing system is provided that has cognitive capabilities from the use of machine learning and self-learning algorithms. The associated inventive method can be used in laser material processing for the purpose of process observation, process control, and process closed-loop control.

A system can have two types of cognitive capabilities: firstly, it seems to an external observer as if the observed system has cognitive capabilities, for example the ability to learn and improve itself autonomously. Secondly, the system implements the cognitive capabilities in a way similar to a natural organism, for example the human brain.

The inventive system has cognitive capabilities such as learning as well as autonomous detection and correction of faults that are used in laser material processing. The use of cognitive capabilities is particularly advantageous in the field of laser material processing. Processing operations such as separation or joining of workpieces differ from one another very strongly from process to process.

It has previously been known firstly to set up each process manually in an individual fashion. After a setting of the process parameters, the process is merely observed here and adapted manually in a corresponding fashion. In the case when a next charge of workpieces is, for example, contaminated or deviates with regard to the workpiece thickness from the previous charge of workpieces, the process must frequently be readjusted manually. Automatic adaptation to process changes has been possible either not at all, or only to a very slight extent. In fact, the demands of vehicle manufacturers in particular who desire to produce a plurality of vehicles simultaneously on a production line amount to being able to adapt the production systems quickly and adaptively to the processing operations.

The rapid learning of processing operations and the detection, correction and avoidance of faults during the processing are requirements that are met by the cognitive capabilities of the inventive processing system.

FIG. 1 illustrates a flowchart of the inventive method with its essential components, which are explained below step by step.

According to the invention, during process feature acquisition all information relevant to the processing operation is detected by a sensor system with at least one sensor. The sensors used are employed to obtain a multiplicity of measured values and information relating to the process, in order to be able to determine process maps, process characteristics or unambiguous fingerprints of the process, which are denoted below as features, from the measured data of the sensors monitoring the processing operation. The determination is performed, in particular, by calculation, or another suitable, preferably electronic, processing of the measured values.

An overview of the inventively used sensors is shown in FIG. 2, and a design of an inventive laser processing system with the appropriate sensors is shown in FIG. 3.

Alongside already known sensors for monitoring a laser processing operation, additional sensors are used in the invention to detect solid-borne and air-borne noise. It is expedient to use at least two sensors each for solid-borne and air-borne noise in order to record noise. Moreover, in the preprocessing the sensor signals for solid-borne and air-borne noise are further filtered, amplified and appropriately scanned in dependence on process. Various directional features are suitable for recording air-borne noise. The locations of the noise sources and the direction of propagation can subsequently be calculated by skillful arrangement of the acoustic sensors. Thus, it is also possible to reduce interference noise from nonrelevant sources, and background noise, or to apply methods such as active noise cancellation.

Furthermore, there are fitted in the laser processing head sensors that serve to detect emission of specific wavelengths and are preferably photodiodes that are sensitive to a specific wavelength range. In addition, it is also possible here to arrange optical bandpass filters for selecting specific wavelength ranges upstream of the corresponding photodiodes. The measured values of these sensors are likewise detected and scanned.

Furthermore, cameras that observe the laser processing operation and, in particular, the laser processing zone are used to obtain measured data. Thus, it is possible to use an in-process camera whose observation beam path is coupled coaxially into the beam path of the working laser in the processing head, in order thereby to image the laser processing zone. Alternatively, it is also possible for a camera outside the processing head to record the processing operation. A camera running ahead, termed a pre-process camera, and a camera running behind, termed a post-process camera, can likewise record the laser processing operation. Diverse workpiece illumination concepts are suitable for recording by camera, depending on the processing operation. Thus, according to the invention use may be made for illumination purposes of light-emitting diodes that are cost effective and can emit in a wide wavelength range, or it is possible to use lasers in various wavelengths with appropriate optics for focusing onto the camera detail on the workpiece surface. Data processing methods such as "region of interest", "qualas", or a geometric data evaluation are particularly suitable and preferred for preprocessing the camera data. In addition, according to the invention use is made of a high dynamic range (HDR) method that advantageously increases the contrast ratio of the recorded camera images. To this end, the images are recorded with different exposure times and offset with each other via an HDR method, resulting in images with a very high contrast ratio.

The quality of the process feature acquisition rises with the number of sensors used, but the costs of the system rise correspondingly. It is therefore to be observed that the inventive method is not limited to the use of the multiplicity of sensors, but can already be performed by using only one sensor, for example the in-process camera.

The process control in accordance with the inventive method and with the use of specific actuators is described below.

In laser material processing, it is normal to design a control program manually for all the actuators involved. During the process, this control program is monitored only via process monitoring, or adapted with the aid of specified control loops such as capacitive distance sensor(s) during laser cutting.

In the inventive method, by contrast, recourse is made to continuous process control, and further new process control options are integrated.

As FIG. 4A shows, during the processing method of laser beam welding, the laser beam power, the distance between the processing head and workpiece, the speed of the processing head relative to the workpiece and the position of the focal point of the processing laser radiation are controlled or closed-loop controlled.

As FIG. 4B shows, during the processing method of laser cutting the supply of process gas is also additionally controlled or closed-loop controlled according to the invention alongside the abovementioned process parameters. Moreover, it is possible in both processing methods to modulate the intensity of control signals at a specific frequency, for example a modulation of the laser radiation intensity of between 90 and 100 percent. Since the control signal is known, it is possible via the sensor data to regain from the system response data relating to the process such as, for example, a gradient field of the feature space as a dependency of the process parameters in different measuring ranges. The controls can be implemented via appropriate linear axes, robot control or other control interfaces.

Although the closed-loop control options increase with rising number of the actuators used, since it is possible to control more process parameters, there is a corresponding rise in the system costs. Consequently, it is to be noted that the inventive method is not limited to the use of the multiplicity of actuators, but can be performed even using only one actuator, for example a laser power controller for laser welding, or a process gas controller for laser cutting.

The step of classifying the laser processing operation in accordance with the inventive method is described in more detail below.

In order to implement an autonomous detection and correction of faults by the inventive laser processing system, the technical cognition must be extracted from the sensor data so that the inventive system can autonomously make decisions for driving the actuator(s).

Furthermore, it is advantageous when the system can be taught by a user thereof and is itself capable of learning. In order to implement cognitive laser material processing, it is provided according to the invention that the system already autonomously knows the essential features from all the sensors used, or detects and learns them and subsequently makes decisions for process control. The aim below is to illustrate three stages of the inventive method, specifically the learning of the process environment, the classification of the current process result, and the control or closed-loop control of the process.

The aim is firstly to explain the learning of the process environment. In order to make acquaintance with the process, there is firstly a need for reference runs or training processings. Each processing operation has a desired result and one deviating therefrom. The test processing or reference run must both include results and, ideally, also the transitions, and the reaction of the system to the process control. If, for example, the aim is to attain a weld seam in a stainless steel lap joint with a defined weld seam width of X mm and a length of Y cm, at least one reference run must be made in which at least one process parameter is varied so that in this reference run both the defined and the specification overshoot in both directions of the process parameter are included.

In this case, according to the invention the human system operator can perform a reference run with a rising laser power as process parameter for which, in the process, the upper and lower specification boundary occurs and is overshot. If the lower specification boundary is, for example, the root penetration, and the upper specification boundary is the seam collapse, it is possible to start a reference run with a laser power so as not to cause root penetration. During the reference run, the laser power is controlled such that it rises continuously until a seam collapse occurs. This process is observed with the process sensor(s) described, which records the appropriate measured values, and used for the purpose of learning the process environment.

Another example relates to production problems between two charges of greasy and nongreasy workpieces. Here, the definition boundaries would also need to be included for the purpose of learning during the reference run. The operator informs the cognitive laser material processing system where the definition boundaries lie, and so the inventive system can learn to distinguish between the regions.

According to the invention, two different methods, which are described below, are provided for the purpose of learning the process environment.

As FIG. 5A shows, linear and nonlinear dimension reducers and variety learning methods such as principal component analysis (PCA), MDS (Multidimensional Scaling), LLE (Locally Linear Embedding) and SVM (Support Vector Machines) can be used for the purpose of learning the process environment. These methods may be used both in combination and on their own. Furthermore, as described further below, a discriminant analysis can be used for the purpose of learning the process environment.

As shown in FIG. 5B, another approach to learning the process environment is to use an artificial neural network (ANN).

Described in a simplified fashion, in the first approach the large volume of sensor data is merged and reduced. In this case, as far as possible all essential features are retained, and redundant information is neglected. At the end, there is for each observed instance a vector and/or a matrix of features that have been obtained from the measured values of the sensors, but whose data volume has been greatly reduced. The aim is to be able to classify the process state uniquely with this matrix or vector, which can also be designated as a fingerprint of the process or characteristic.

The process is different with artificial neural networks since here the network is trained, and the learned information is subsequently present in the network and the result can then be classified. The output neurons thus initially use a classification with the aid of the trained data. Closed-loop control can subsequently be performed with the aid of this classification.

Monitoring the processing operation, there is a need for the current process result to be acquired, compared with the previously learned desired region, which can be considered as a point set in the feature space, and, if appropriate, adapted to the process parameters, as shown in FIGS. 6A and 6B. The process parameter adaptation can and should already be performed before emergence from the desired region. Here, the predetermined point set, which is used to closed-loop control the system, can be adapted so that in the case of closed-loop control the current fingerprint of the sensor system already leaves the predetermined point set at an instant when the fingerprint enters an edge region of the desired region.

The classification of the current process result using the first method is described below (FIG. 6A). The cognitive laser material processing system has already stored in the database of a memory the learned process environment, the learned features or fingerprints in the form of a vector or a matrix. The measured values of the sensors, currently being obtained from the process, must initially be reduced in data volume and brought for the purpose of comparison into the same data space, that is to say the feature space, as the feature vectors or fingerprints; in this way, a current fingerprint is obtained as a reduced sensor data vector or matrix in the feature space and is compared with the learned point set in the feature space. It is possible in this way to obtain the probability that the currently acquired data point is closest to a certain feature point, feature spot or feature item. It becomes known in this way whether this feature point is still inside the desired region; furthermore, the correction probably required for the process parameter is known.

The classification of the current process result by means of artificial networks (FIG. 6B) is performed by the trained network. The classification result is whether the process is still in the desired region, and with which tendency the process parameter is to be adapted.

The control or closed-loop control of the process in accordance with the inventive method is performed in the following way. By means of the classification result, the control unit already knows the direction and the intensity with which the appropriate actuators have to be activated. Various closed-loop controlling methods can be used. Thus, for example, it is possible to use the minimization of the geodesic distance between the desired feature vector and result vector, or a closed-loop controlling method with a Kalman filter and minimization of the mean square error. In addition, it is possible to determine the tendency to regulation from the multidimensional feature spaces or feature spaces via the "support vector" classification. The closed-loop controller is then not allowed to overshoot the previously defined safety region.

The invention can be applied in a plurality of method variants, of which a few are presented at this juncture.

It is important in process monitoring to discuss some faults (errors) clearly. The use of cognitive laser material processing also returns good results here. It is necessary in the fault detection method (as illustrated in FIG. 7) firstly for the operator to prompt a fault deliberately so that the cognitive system can learn this. Once the system has learned the fault it can detect this accurately. This is intended to be illustrated by the following example. The aim is for the dross or the formation of a burr on the cutting edges during a laser cutting process to be detected with the aid of a process sensor system with various sensors, inter alia an in-process camera. The operator makes a reference run with constant control parameters except for the process gas, which he allows to drop so far via the controller during the reference run that a dross clearly results. Once the reference run is ended, the cognitive laser material processing system uses the sensor data to calculate the appropriate principal components via the PCA, Principal Components Analysis, or a combination of the other methods of the dimension reducers presented. The operator now informs the system of the areas on the workpiece at which a dross has resulted. Using the information relating to where the dross has resulted on the cutting edge, and to the points at which corresponding principal components have been calculated from the sensor data, the cognitive system can subsequently calculate the corresponding components, a vector or matrix, which includes the collected features or the fingerprint respectively for a dross to result. As the machine continues its operation, it can then be calculated from the current sensor data by matrix-vector algebra during the process whether the learned fault (error) has occurred, and this can be indicated to the operator.

The same method can be used, in order, for example, to detect effects occurring during laser beam welding or laser cutting: lack of fusion (false friend), seam collapse (insufficient fill), full penetration (root fusion), cutting width X, penetration depth status, cutting edge roughness, burning effects, weld seam width Y, welding status, root penetration status, joint cross section status, gap in the lap joint, gap in the butt joint, lateral offset, ejections (dropouts), pores, holes.

The invention can also be used to simplify a charge change that previously required an adaptation of the laser material processing system. The workpieces of the new charge have slightly changed properties, for example material thickness or degree of contamination. Once again, firstly a learning phase, and subsequently a classification phase are performed. A closed-loop controlling process can be implemented as early as after the classification phase. However, it is also possible to estimate new control parameters for a process change that occur, for example, as a result of a charge change.

According to FIG. 8, the measured values of the process sensor(s) are acquired in the learning phase by a reference run. Set once again as reference run are process control parameters which are constant except for one control parameter which is varied. By way of example, in the case of a laser beam welding process the laser power can be raised continuously during the reference run. The acquired data are processed by the cognitive laser material processing system with the aid of dimension reducers, cf. FIG. 9. The output data of each sensor used are firstly filtered with the aid of an appropriate lowpass. Subsequently, the n principal components are output via principal component analysis. The data are then normalized and freed from the mean. The feature value data for the sensors used in relation to each time segment acquired are obtained at the end of this processing step. The corresponding features or fingerprints and their mapping rule are stored in a database for feature mapping rules. The user of the system now defines on the workpiece an area that corresponds to the desired result. This definition is converted into a vector with the aid of which it is possible to train a classifier. Support vector machines are used in this method in order to be able to perform a classification. A method of support vector classification is applied in this case. It describes a mathematical method for distinguishing desired and undesired process results that by performs a multidimensional separation of the feature space based on the users's specifications. The database with feature mapping rules describes the mapping rule(s), and the classification database describes the separation of the feature spaces.

The application of the learned process knowledge for the classification and/or assessment of the current processing operation (FIG. 10) is described below. After the learning phase, the cognitive laser material processing system monitors the processing operation in accordance with the previously learned user wishes. The sensor data are dimensionally reduced on the basis of the specifications of the specified feature mapping rules. The output data are located in the predetermined feature space or feature space. The classification data learned by the operator via the support vector classification method serve the purpose of evaluating the current processing operation. An evaluation can be carried out as to whether the current process result lies in the desired region defined by the user, and which tendency is to be preferred via a probability for the process control parameter in order to closed-loop control the process.

The aim now is to describe the estimation of new control parameters or process parameters in the case of small process changes owing to a charge change. If the processing operation is modified for a certain duration, for example by a slight change in the workpiece properties in the case of a charge change, it is possible to estimate the new control parameters. It is necessary to this end to perform a new reference run 2 in addition to the previous reference run 1. The same control parameters are applied for reference run 1 and reference run 2.

As shown in FIG. 11, the sensor data or the measured values of the sensors of reference run 2 are dimensionally reduced again. The mapping rules are now applied to the recorded sensor data of reference run 1. The occurrence probabilities of the features from reference run 1 during reference run 2 are calculated using the inventive method of support vector classification. The cognitive laser material processing system can thus calculate, from the position on the workpiece or from the control parameters used at this point and from occurrence probabilities of the features, which control parameters in the new process give rise to a very similar or virtually identical result as in the previous processing operation.

As in the previously outlined methods, features are obtained from the process data in feature-based closed-loop controlling methods. These features are classified by the operator by means of initial and regularly recurring reference runs, with corresponding evaluation as to whether the control parameter is to be adapted. The corresponding features and the associated classifications are stored in a database, if appropriate with an adaptation proposal. The operator thus assesses the system at regular intervals and thereby teaches it. The system can thus firstly establish whether the current process result is still located in the prescribed feature space, and whether the system is to perform an adaptation of the control parameters. The learned features and adaptation proposals therefore increase over time, and the system continues to improve in the processing. Similar features and adaptation proposals can be offset with each other again in order to avoid an excess of features.

The aim below is further to explain the inventive high dynamic range (HDR) method more precisely. In this method, either an imaging sensor is scanned multiply, that is to say at least twice, per image at different instants, or a plurality of images, that is to say two, three or more images are taken with different exposure times or with a plurality of cameras and subsequently processed with each other to form at least one image. This procedure enables a recording of images, image sequences or videos that simultaneously visualize in a single image the surrounding processing surface, the process emission and the vapor capillary or the keyhole. In the case of an imaging of laser processing operations, the intensity values of said areas are distributed over a wide range that can be visualized by said method in one image. An image or image sequence thus produced is displayed in a fashion adapted via a gray scale value or tone mapping method for the purpose of display on a screen or display device in conjunction with a process monitoring system or an evaluation or control unit with a comparatively low intensity resolution.

As illustrated in FIGS. 12 and 13, according to the invention a plurality of images or pixel arrays are processed with each other in order to perform an HDR method or a method for better visualization of processing surface, process emission and vapor capillary (keyhole).

The different images can result from multiple scanning of an imaging sensor, or from simultaneous imaging with a plurality of cameras, or by sequential imaging with one camera but different exposure times, this being termed a multiexposure technique. The processing of the individual recorded images can take place with various types of method. This includes, in the simplest case, the adding up and averaging of the individual image values of a plurality of images of an image sequence from at least two recorded images. To obtain more effective imaging, the image values or pixels from an image sequence of at least two recorded images can be averaged by weighting.

As weighting method, either an entropy method can be used for weighting by information content, or it is possible to perform weighted averaging taking account of the camera response function. This requires an inference to be drawn as regards the real or feasible radiant energy per surface, this being yielded by the following function:

$$x_{ij} = \frac{I^{-1}(y_{ij})}{t_i}$$

The weighting for the individual radiant energies is then:

$$x_j = \frac{\sum_i w_{ij} * x_{ij}}{\sum_i w_{ij}}$$

Here, i is the image index from an image sequence of a plurality of recorded images, j is the pixel position, $t_i$ is the exposure time or scanning time of the recorded image i, $y_{ij}$ is the intensity value of the pixel of the recorded image i at the position j, $I^{-1}$ ( ) is the inverse camera response function, $x_j$ is the estimated radiant energy per surface at the pixel position j, and $w_{ij}$ is the weighting function of the reliability model. The invention relates explicitly to the use of these illustrated HDR image processing methods in processing methods such as separation or joining of materials, in particular with the aid of laser processing heads and/or the inventive process monitoring system connected thereto.

The aim below is further to describe with more precision the sensors and classification methods used.

Any sensor that enables a sensor data output can be used in principle as sensor system. In particular, these are by way of example microphones or solid-borne acoustic sensors, cameras, photodiodes, probes, technical evaluation and monitoring signals as well as actuator parameters such as, for example, laser power.

Feature extraction and dimension reduction: it is possible here to use all methods that reduce the data volume and maintain the information content as far as possible. These are here, in particular, principal component analysis (PCA), independent component analysis (ICA), wavelet analysis, Fourier, Fast-Fourier and Laplace analysis, feature and object recognition methods, locally linear embedding, artificial neural networks, multidimensional scaling and many more.

The reduced data volume can be interpreted as a point cloud in a multidimensional space that has been obtained from a space of higher dimension. By reducing them, it is possible for the data to be compared in a finite time with previously recorded and classified and/or learned data volumes. It can be established in this classification whether the new sensor data already resemble recorded sensor data, and this resemblance can be assigned a probability. If a defined threshold value for a similarity probability of a previously recorded data volume is overshot, it is possible to follow the solution or control or closed-loop control approach previously stored thereunder. If the threshold value for a similarity probability relating to previously learned data volumes is overshot, the system is in a new situation.

The behavior for a new situation can either be learned by interrogating a human operator, or tried out using the similarity principle from the previous data and solution strategies. Use is made here of self learning algorithms that, once an objective has been set, subsequently check after trying out a self developed approach whether a goal has been achieved, and evaluate the selected solution approach. The following methods can be used for the classification, saving of empirical values and solution strategies, and as self learning algorithms: support vector machines, support vector classification, fuzzy logic, information fuzzy networks, fuzzy K-nearest neighbor classifier, K-nearest neighbor classifier, reinforcement learning, Bayesian networks and Bayesian knowledge databases, naïve Bayesian classifiers, hidden Markov chains, artificial neural networks and back propagation, regression analysis, genetic programming or decision trees.

The solution strategy resulting after the classification, or a control of closed-loop controllers or actuators can be of simple design, but they can also control the type of data acquisition. If, for example, no threshold value for a known data volume is reached, the type of data acquisition can be changed. For example, this can be performed by adapting a wavelet analysis to the new frequency bands, or by changing from PCA to ICA.

High Dynamic Range Method (HDR Method)

An HDR method can be used to calculate a relatively high contrast ratio from a plurality of recorded images or image value matrices and vectors with different contrast ratios. To this end, when imaging or observing a scene it is possible to record a plurality of images with different exposure times from which an image or image sequence with an improved contrast ratio can subsequently be calculated. In order to produce an image sequence with different contrast ratios, it is possible to use the so called multiexposure method to record a plurality of images with a different exposure time.

However, it is also possible for the pixel values to be multiply scanned during an exposure time. An image sequence with different contrast ratios is produced in this way during an exposure time. Additionally, in this case the charges present on an imaging sensor and which represent the pixels can be retrieved once, and cannot be retrieved a second time thereafter. However, there are techniques such as the nondestructive reading, also termed nondestructive read out (NDRO), or a multislope or single slope readout or cooled imager or charge injection imaging (CIS) or thin film on CMOS (TFC) or active pixel sensor (APS) or single slope or correlated double sampling (CDS), that enable multiple interrogation of a charge, for example in the case of a CMOS chip, during a single exposure period, without the interrogated charge value being changed by the scanning. According to the invention, these techniques can be used to observe a laser processing operation in order thereby to implement an observation or control method, it being possible to use the HDR method to simultaneously observe and resolve the process emissions, the vapor capillary (keyhole), the melt pool, the weld seam geometry and the weld seam guidance during a laser welding operation to be performed, or to simultaneously observe and resolve the interface, the cutting edge, the process emission and also dross formation and the dross geometry during the performance of a laser cutting operation. If appropriate, it is possible in both cases to observe a laser line projected onto a workpiece to be machined (as also shown in FIG. 12).

Reinforcement Learning (RL)

Reinforcement learning (RL) denotes an area of machine learning. It describes methods in which systems or agents are applied to environments in order to maximize a reward. RL finds in this case mapping rules or policies for one or more system states or states onto system action plans or actions. The policies of RL can be used according to the invention for the purpose of self improving control and observation of laser processing operations.

FIG. 14 shows a possible policy of how RL can be integrated in a laser processing operation. The values to be learned are symbolized by the matrix Q. The Q matrix consists of the components QS1, QSn, QSA, QDR, QR1, QRm, which are capable of including one or more values. These components are initialized with a start value and optimized according to an RL method. This optimization takes place in that an action is executed and is evaluated by a reward function, and this evaluation modifies the values of the Q matrix in a fashion reminiscent of a theatre, where a critic assesses an actor and the actor adapts his actions. As described before, a point cloud with an appropriate classification can be obtained by a human expert in a reference run or from a learning phase. Said classification thus stores the characteristics or point clouds or features or fingerprints or sensor measured values that constitute the desired process result. This can be implemented by a support vector machine or another classification. This can constitute a reward function in accordance with which the RL method operates. The Q matrix is thus optimized in accordance with this reward function learned by the person. Weighting values or adjustment parameters can be learned and optimized in this way, examples being the weighting of different sensors one among the another (QS1, QSn), the selection of special features that are used for control or observation purposes (QDA), the selection of the desired values for diverse closed-loop controlling methods (QDR), or else the closed-loop controller adjustment parameter, for example in a proportional fashion, P term, an integral fashion, I term, and a differential fashion, D term (QR1, QRm). In this way, the control, closed-loop controlling or observation features of a laser processing system can be optimized throughout the duration of use. According to the invention, methods that can be applied within reinforcement learning or another machine learning method in laser material processing are as follows: Markov decision process (MDP), Q learning, adaptive heuristic critic (AHS), state action reward state action (SARSA) algorithm, self organizing map (SOM), adaptive resonance theory (ART), multivariate analysis (MVA), expectation maximization (EM) algorithm, radial basis function network, time series prediction, automatic target recognition (ATR), radial basis function (RBF) and similar methods.

Discriminant Analysis and Closed-Loop Controlling Method

The discriminant analysis (DA) or linear discriminant analysis (LDA) also called Fisher's linear discriminant analysis, is a statistical method of analysis that has a similar functional principle to the already described principal component analysis. By contrast with principal component analysis, DA also accounts for the class membership of a classification. DA can also alternatively be used for dimension reduction in the inventive method, but at the same time constitutes a combination of dimension reduction and classification methods.

As illustrated in FIG. 15, it is thereby possible to record sensor data, reduce them in dimension, and classify them using a method as already described with the aid of previously learned data. The classification result can then be used as a basis for an actual value calculation for one or more closed-loop controllers with the aid of learned desired values in order to control one or more actuators or control parameters. According to the invention, DA can be combined with other dimension reduction methods in laser material processing so that, for example, it is possible firstly to perform principal component analysis and, after that, DA. This also holds for the other dimension reduction methods already described, which reduce a sensor data input vector of dimension Y to a dimension X, where X<Y. The combinations can also differ from one another for the respective sensors. Thus, the independent component analysis already mentioned, which extracts features in accordance with the statistical independence, is particularly suitable for acoustic sensors, while principal component analysis is particularly suitable for imaging sensors. Further dimension reduction methods can be used according to the invention in a laser material processing system described: kernel principal component analysis, locally linear embedding (LLE), Hessian LLE, Laplacian eigenmaps, local tangent space alignment (LTSA), semidefinite embedding (SDE), maximum variance unfolding (MVU), curvilinear component analysis (CCA), data driven high dimensional scaling (DD-HDS), autoencoders, as special variant of a feed forward artificial neural network, Boltzmann machines and all methods using a similar principle.

For the purpose of particularly rapid data processing, principal component analysis or other dimension reduction methods or feature extraction or an HDR method can also be executed according to the invention on a cellular neural network (CNN) integrated in an image acquisition unit in a laser processing system. CNN is a parallel calculating method similar to an artificial neural network.

Furthermore, as shown in FIG. 16, according to the invention it is also possible for the purpose of rapid data processing also to closed-loop control a laser processing operation directly with the aid of desired values from a dimension reduction, whereupon classification can then serve to determine the best desired values with an optimization of a signal-to-noise ratio. It is possible in this way to implement very high frequent controlling cycles, in conjunction with high adaptivity through taking account of the learned classification results.

The invention claimed is:

1. A method for monitoring a laser processing operation to be performed on a workpiece, having the following steps:
   detecting at least two current measured values by means of at least one sensor that monitors the laser processing operation,
   providing a predetermined point set in a feature space, wherein the predetermined point set is defined inside the feature space by means of a learning process, by performing a reference run in which at least one process parameter is varied, wherein in the laser processing operation a upper and a lower specification boundary occurs and is overshot, determining at least two current features from the at least two current measured values, the at least the two current features jointly representing a current fingerprint in the feature space, wherein the determination of the at least two current features from the at least two current measured values comprises a method for data reduction or dimension reduction such as principal component analysis, and classifying the laser processing operation by detecting the position of the current fingerprint relative to the predetermined point set in the feature space, the at least one sensor comprising at least one camera unit that records camera images with different exposure times and processes said camera images with each other using a high dynamic range (HDR) method in order to provide images with high contrast ratio as current measured values.

2. The method as claimed in claim 1, wherein the HDR method is designed to process the camera images so that, in the case of performance of a laser processing operation, the surrounding processing surface of a workpiece to be machined and the process emission can be simultaneously visualized in one image.

3. The method as claimed in claim 1, wherein the camera images are recorded by multiple scanning of an imaging sensor of the camera unit, by simultaneous imaging with a plurality of cameras, or by sequential imaging with one camera with different exposure times.

4. The method as claimed in claim 1, wherein the processing of the recorded camera images by the at least one camera unit is performed by means of a weighting method with the aid of an entropy method or with the aid of a camera response function.

5. The method as claimed in claim 1, wherein the camera images to be processed are recorded by means of at least one of a camera running ahead before the laser processing operation, a camera imaging the laser processing zone, and a camera running behind after the laser processing operation.

6. The method as claimed in claim 1, having the step of closed-loop controlling at least one process parameter of an associated actuator in such a way that, when the current fingerprint leaves the predetermined point set of the feature space, the at least one actuator is activated so that the change in the associated process parameter corresponds to a gradient in the feature space that, starting from the fingerprint, extends in the direction of the predetermined point set in the feature space.

7. The method as claimed in claim 6, wherein the gradient field of the feature space is determined in dependency of the process parameters in different regions at the points in the feature space that are representative of the respective region with regard to the gradient.

8. The method as claimed in claim 7, wherein the gradient of the feature space is determined in dependency of a process parameter by varying the process parameter at a predetermined point of the feature space.

9. The method as claimed in claim 6, wherein the at least one actuator is selected from a group that comprises a controller of the laser power, a processing velocity controller of the processing head relative to the workpiece, a controller of the focal point of the processing laser beam, a controller of the distance of the processing head from the workpiece, a controller of the lateral offset, and a controller of process gas supply.

10. The method as claimed in claim 1, wherein the at least one sensor is selected from a group that comprises at least one photodiode with filters for specific wavelengths, solid-borne and air-borne acoustic sensors, and at least one camera unit with an appropriate surface illumination.

11. The method as claimed in claim 1, characterized in that the determination of the at least two current features from the at least two current measured values comprises a method for data reduction or a linear discriminant analysis, and the classifying comprises support vector machines or a support vector classification.

12. A device for performing a method for monitoring a laser processing operation to be performed on a workpiece in accordance with the preceding claims, comprising:

at least one sensor for monitoring the laser processing operation that is suitable for detecting at least two current measured values, a data processing unit for determining at least two features from the at least two current measured values in order to create a current fingerprint in a feature space, a memory unit for storing a predetermined point set inside the feature space, wherein the predetermined point set is defined inside the feature space by means of a learning process, by performing a reference run in which at least one process parameter is varied, wherein in the laser processing operation a upper and a lower specification boundary occurs and is overshot, and a classification unit for evaluating the laser processing operation by detecting the position of the current fingerprint relative to the predetermined point set in the feature space, wherein the at least one sensor comprises at least one camera unit that records camera images with different exposure times and processes said camera images with each other using a high dynamic range (HDR) method in order to provide images with high contrast ratio as current measured values, and wherein the data processing unit is adapted to determine the at least two current features from the at least two current measured values by a method for data reduction or dimension reduction such as principal component analysis.

13. The device as claimed in claim 12, further having a control unit for controlling at least one process parameter of an associated actuator in such a way that, when the current fingerprint leaves the point set of the feature space, the at least one actuator is activated so that the change in the associated process parameter corresponds to a gradient in the feature space that, starting from the fingerprint, extends in the direction of the predetermined point set.

14. The device as claimed in claim 13, wherein the at least one actuator is selected from a group that comprises a controller of the laser power, a processing velocity controller of the processing head relative to the workpiece, a controller of the focal point of the processing laser beam, a controller of the distance of the processing head from the workpiece, a controller of the lateral offset, and a controller for process gas supply.

15. The device as claimed in claim 12, wherein the at least one sensor is selected from a group that comprises at least one photodiode with filters for specific wavelengths, solid-borne and air-borne acoustic sensors, and at least one camera unit with an appropriate surface illumination.

16. A laser processing head for processing a workpiece by means of a laser beam, having a device as claimed in claim 12.

* * * * *